Figure 1:
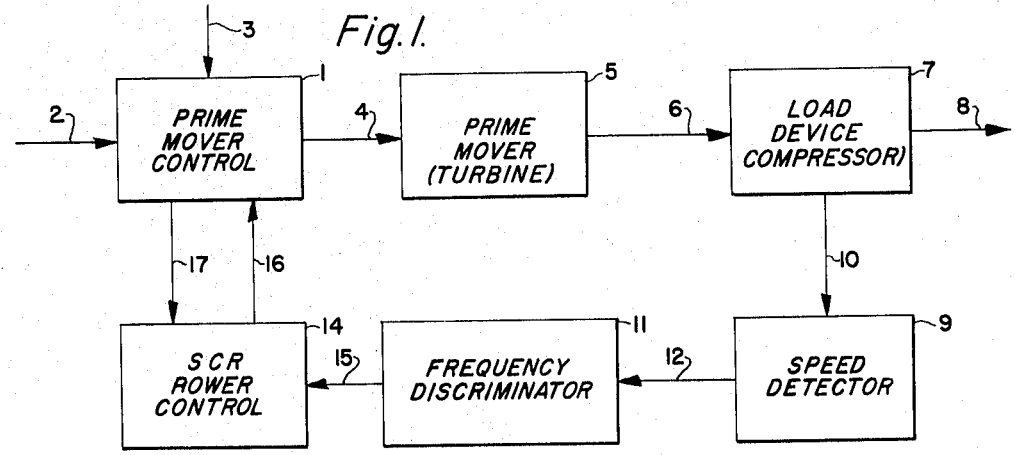

March 22, 1966 L. A. SKOUBO 3,242,346
STATIC SPEED CONTROL APPARATUS RESPONSIVE
TO VARIATIONS IN FREQUENCY
Filed Aug. 31, 1961 2 Sheets-Sheet 1

INVENTOR:
LEO A. SKOUBO,
BY
Attorney.

March 22, 1966 L. A. SKOUBO 3,242,346
STATIC SPEED CONTROL APPARATUS RESPONSIVE
TO VARIATIONS IN FREQUENCY
Filed Aug. 31, 1961 2 Sheets-Sheet 2
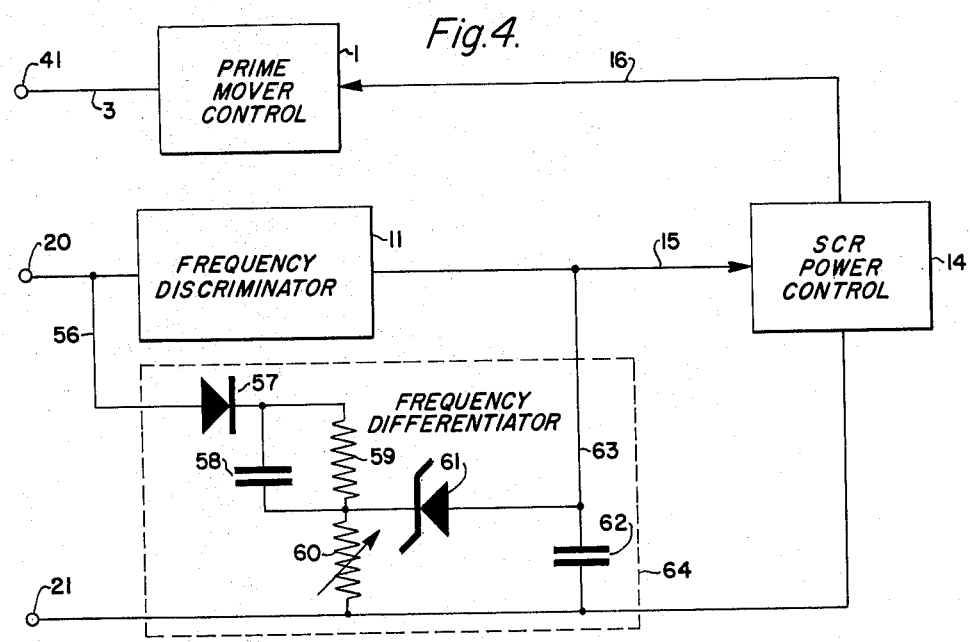
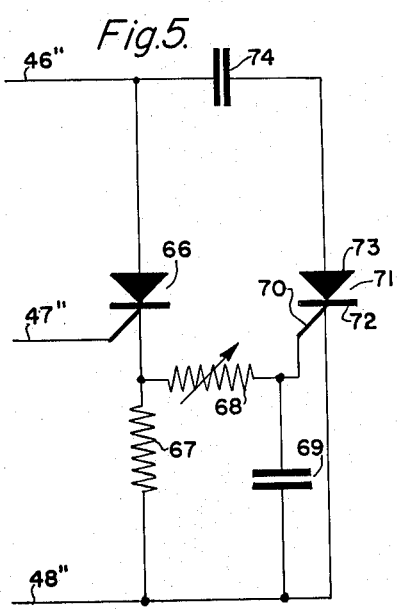
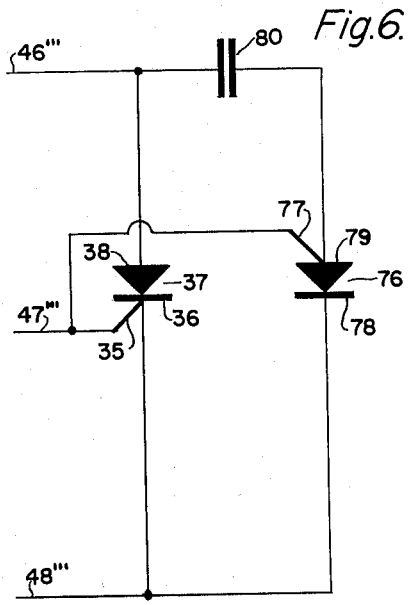
INVENTOR:
LEO A. SKOUBO,
BY Thomas D. Vinton
Attorney.

United States Patent Office 3,242,346
Patented Mar. 22, 1966

1

3,242,346
STATIC SPEED CONTROL APPARATUS RESPONSIVE TO VARIATIONS IN FREQUENCY
Leo A. Skoubo, Lomita, Calif., assignor to The Garrett Corporation, Los Angeles, Calif., a corporation of California
Filed Aug. 31, 1961, Ser. No. 135,263
19 Claims. (Cl. 290—40)

This invention relates to electrical frequency controls and more particularly to means utilizing apparatus responsive to variations in frequency for controlling the speed of rotation of devices such as turbines.

Since the days of the early reciprocating steam engines there has been a need for speed control. At the present time a further need for improved speed-control apparatus appears in connection with rotating turbines operating at speeds of thousands of revolutions per minute. Reliability of over-speed controls likewise is of current importance, as is stability of such controls notwithstanding wide changes of ambient conditions, such as extremes of temperature.

In accordance with this invention, the need for improved speed-frequency control apparatus is met by generating an alternating-current speed signal having a frequency proportional to the speed of rotation of the device to be controlled. A frequency discriminator comprised of semiconductor elements gives an electrical output in response to the speed signal input only at and above the frequency corresponding to the speed of rotation desired.

The discriminator output voltage triggers conduction through a silicon controlled rectifier, a semiconductor device having an operating mode somewhat like that of a grid-controlled gaseous discharge tube. The latter thus provides an "on-off" flow of electric current which, in turn, is utilized to a speed control element, such as a solenoid valve, an electro-mechanical relay, or other electrically driven adjustable device for effecting speed control of a prime mover.

Not only is this basic embodiment possible, but the controlled rectifier may be one of moderate power which is connected to another controlled rectifier of higher power, so that many amperes of current may be controlled to effect high-powered electromechanical control.

The discriminator circuit provides an electrical "bounce" mode of operation, which has the effect of increasing the certainty of control when the turbine prime mover, say, approaches the desired regulation speed very quickly, as in cases of "run-away." In addition, it is possible to include a frequency differentiator, which further enhances this action.

Further, a time-delay reset modification of the basic apparatus is possible. Two controlled rectifiers are employed having an electrical delay circuit between them. One rectifier responds to the discriminator output voltage to turn the prime mover speed control off, and the other automatically turns it on again after a brief interval. If the variation from normal operating conditions has been removed within the interval, normal operation is obtained. If not, the cycle of turn off and turn on continues, giving safety control until normal conditions are restored.

Still further, by employing two controlled rectifiers responsive, respectively, to triggering signals of opposite polarity, and modifying the discriminator to supply an output of one polarity for under-speed and of the opposite polarity for over-speed, a frequency reset type of control is provided. Since this embodiment is dependent only on speed for control, such control is independent of the load upon the prime mover or the flow of fuel, for example, that is supplied to it.

2

Typically, the speed controlled device is a turbine, and the controlled rectifiers are the semiconductor devices generally known as silicon controlled rectifiers.

It is an object therefore, to provide a frequency-responsive speed control having the foregoing features and advantages.

Another object is to provide such a control having no moving parts.

Another object is to provide such a control which exercises more positive control for more rapid changes in frequency; that is, for more rapid acceleration of the controlled device, more positive control is provided.

Another object is to provide a speed-frequency control having large electrical power output.

Another object is to provide such a control having an efficiency approaching 100%.

Another object is to provide such a control having a frequency differentiator which gives a control component proportional to rate of change of frequency.

Another object is to provide such a control having an automatic reset arrangement active after a selected time delay.

Another object is to provide such a control having an automatic reset actuated by a change in frequency of the signal controlled.

Another object is to provide a speed control by the operation of the subject control according to the automatic time delay or the automatic frequency reset modes of operation.

Another object is to provide a frequency-speed control device that is insensitive to shock and vibration.

Another object is to provide such a control that is compact and of light weight.

Another object is to provide such a control having a long and reliable life.

Other objects and features of the invention as disclosed in the following detailed description and accompanying drawings of preferred embodiments will become apparent to those skilled in the art.

Figure 2:
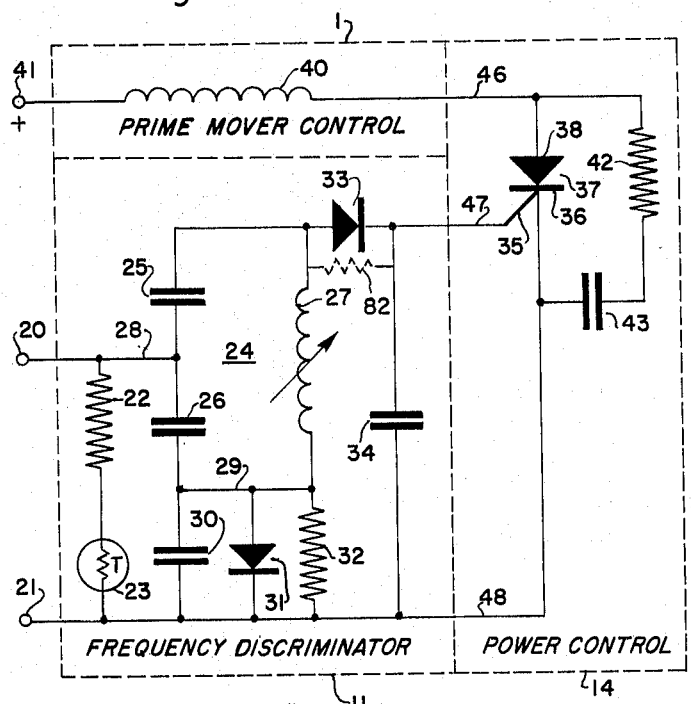
Figure 3:
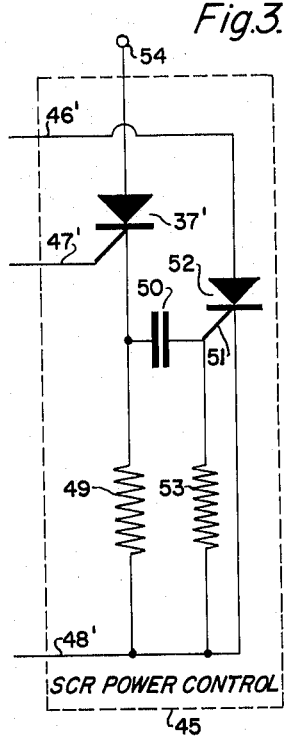
Figure 2A:
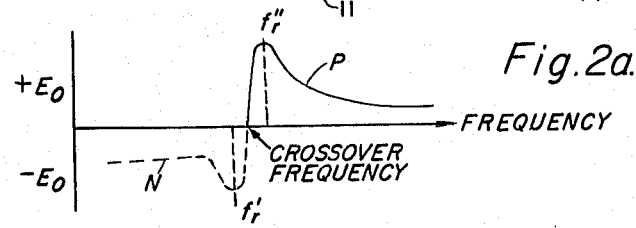

FIG. 1 is a block diagram showing the application of the invention as an overspeed control for a turbine, FIG. 2 is a schematic circuit diagram of the basic overspeed control, FIG. 2a represents graphically an idealized frequency-output voltage characteristic helpful in explaining the operation of discriminator used in the basic overspeed control of FIG. 2, FIG. 3 is a schematic circuit diagram of a high power addition to the circuit of FIG. 2, FIG. 4 is a block and schematic circuit diagram of an over acceleration modification of the basic overspeed control of FIGS. 1 and 2, FIG. 5 is a schematic diagram of an automatic time delay reset modification of the circuit of FIG. 2, and FIG. 6 is a schematic diagram of an automatic frequency reset modification of the circuit of FIG. 2.

Referring now to the drawings wherein like reference characters designate like or corresponding parts throughout the several views, the block diagram of FIG. 1 shows a prime mover control 1. This, for example, may comprise a solenoid valve or an electrically-driven fuel, or working-substance, metering device. Prime mover power, such as fuel or gaseous working substance, enters the device as schematically shown by arrow 2. Similarly, power to actuate the control 1 is applied thereto as indicated by arrow 3.

The suitably-metered fuel or working-substance 2 passes from control 1 via a pipe or equivalent represented by arrow 4 to prime mover 5. Typically, rotational energy is transmitted from prime mover 5 by a shaft, represented by arrow 6, to a compressor or other load device 7, which may be employed to compress air, produce electricity or perform other functions. Power output for useful work is schematically shown in FIG. 1 by arrow 8.

The speed detector 9 comprises means for producing an alternating electrical signal having a frequency related to the speed to be controlled. A shaft 10, intercouples the speed detector 9 and turbine 7. Speed detector 9 is normally a known inductive pickup, which gives an alternating voltage produced by relative motion between permanent magnets (not shown) disposed for relative motion in inductive relation to pickup coils (not shown). If turbine 7 is an electrical alternator, for example, line and arrow 10 become a pair of electrical conductors connected to the alternating-current output circuit of the alternator, and speed detector 9 is not required.

In any event, an alternating signal having a frequency representing the speed of load device 7, is conveyed to frequency discriminator 11 via conductors represented by line and arrowhead 12. The frequency discriminator member 11 produces a direct-current voltage representing the frequency of the incoming alternations by means detailed in FIG. 2 and hereinafter described.

The D.-C. voltage output of the frequency discriminator 11 constitutes control information which becomes expressed in terms of electric power by SCR power control 14, the two being connected by conductors 15. The designation "SCR" stands for "silicon controlled rectifier," a solid state electrical device employing silicon as a semiconductor material, having a gate, or low power control electrode, and having a cathode and an anode for passing relatively large currents at very small voltage drop once the device has been triggered into conduction. The back conduction, and the forward leakage occurring when the device is not triggered, are very small.

The electrical power output from SCR power control 14 passes through conductors 16 to the coil of a solenoid valve (not shown), or equivalent, in prime mover control 1. The direct-current output voltage of frequency discriminator 11 controls the triggering of the silicon controlled rectifier or rectifiers of power control 14, and is supplied to the latter via conductors, indicated by the line and arrowhead 17 of FIG. 1.

It will be recognized that the elements and the interconnection of the same in FIG. 1 are such as to constitute an overspeed control for the system, or, with automatic reset, a speed control for the system.

In FIG. 2 the frequency discriminator is enclosed by dotted lines 11. At terminal 20 the A.-C. speed signal input is impressed, corresponding to the input at 12 in FIG. 1. The return circuit of the input is completed at the negative terminal 21 in FIG. 2.

Between these two input terminals are connected resistors 22 and 23, in series. Resistor 22 is of the usual type, preferably having a negligible temperature coefficient, but resistor 23 is a "thermistor," having a marked negative temperature coefficient. That is, as the temperature increases the resistance decreases. The resistance of resistor 22 is typically of the order of five hundred ohms, while the resistance of thermistor 23 is of the order of 2,500 ohms at 25° centigrade.

The thermistor is included to render the discriminator 11 insensitive to fluctuations in ambient temperature regardless of the fact that known silicon controlled rectifiers trigger at a lower input voltage level at high ambient temperatures than at low ambient temperatures. The reduced resistance of the thermistor at high temperatures loads the resonant elements described below, and reduces the response of the discriminator accordingly. In the preferred embodiments temperature insensitivity has been accomplished to the degree that over a range of eighty degrees centigrade the variation of the actuation frequency was of the order of 0.2%.

In the discriminator 11, a split-capacitance fed a parallel-resonant circuit 24, having capacitors 25 and 26 and inductor 27 is provided. Each capacitor may have a capacitance of the order of 0.01 microfarad and the inductor is conveniently made variable for adjusting the actuation frequency at overspeed. A range of inductance of from a fraction of a henry to a few henries is desirable. A direct connection from input terminal 20 to the junction between capacitors 25 and 26 is made by conductor 28.

Similarly, a direct connection from the terminal of capacitor 26, is coupled directly to the lower extremity of inductor 27 by conductor 29. From conductor 29 to the negative terminal 21 are connected in parallel, a capacitor 30, a diode 31 and a resistor 32. Capacitor 30 has, but need not be limited to, the same capacitance as capacitor 26. Diode 31 may be of the silicon semiconductor type with the cathode connected to terminal 21. Resistor 32 is of relatively high value, and has a resistance of one megohm, for example. Diode 33 and filter capacitor 34 complete the group of discriminator elements. Diode 33 is the same as diode 31 and capacitor 34 has the same capacitance as either of capacitors 26 or 30. A resistor 82, shown in dotted lines, is coupled in parallel with diode 33 to form a modified discriminator 11 suitable for use in the alternative embodiment of this invention described below with reference to FIG. 6.

The function of the discriminator 11 is to trigger the SCR power control 14 by applying a positive potential to gate electrode 35 of the silicon controlled rectifier 37. Assuming that there is no current flow between anode 38 and cathode 36 of controlled rectifier 37 as an initial condition, this condition will persist until a positive potential of the order of two volts is accumulated upon filter capacitor 34, at which potential the controlled rectifier will be "triggered" and a full forward current flow of an ampere, for instance, will flow from anode to cathode as long as a sufficient positive potential exists on anode 38. This flow will continue notwithstanding subsequent changes in the voltage applied to gate electrode 35. To "turnoff," or reset, rectifier 37, the anode-cathode circuit must be broken, or the anode potential reduced sufficiently.

In FIG. 2, anode 38 is connected to the prime mover control 1, which is detailed as a winding 40 representing, for example, the coil of a solenoidal valve, or equivalent. The opposite terminal of coil 40 is connected to D.-C. control-power terminal 41, which corresponds to the control power input representation 3 of FIG. 1. The voltage thereof is positive with respect to the potential of terminal 21 of FIG. 2.

For this embodiment a holding circuit comprised of resistor 42 and capacitor 43 in series is connected between anode 38 and cathode 36 of controlled rectifier 37. The resistor may have a resistance of ten ohms and the capacitor a capacitance of a half microfarad. When the controlled rectifier 37 is not conducting, capacitor 43 charges to the full anode-to-cathode potential. This charge subsequently provides a sustaining or holding current in the controlled rectifier when the load 40 is highly inductive, as shown. If the load is less inductive or resistive, this additional circuit is not required and elements 42 and 43 may be eliminated.

By introducing the A.-C. speed signal at a junction common to capacitors 25 and 26, the effective input impedance of the parallel resonant circuit 24 is reduced to about one half that which would exist if conductor 28 were to be coupled to a junction common to capacitor 25 and diode 33. This makes it possible to connect to the parallel resonant circuit 24 an output circuit having an impedance of from the order of a thousand ohms to substantially infinity ohms without affecting the crossover frequency of the discriminator 11. The cross-over frequency of the discriminator is that frequency at which a positive output is obtained. At lower frequencies the output is zero.

In explaining the operation of discriminator 11, it will be assumed first that the resistor 82 coupled in parallel with diode 33 is omitted. When this is the case, the diode 33 effectively prevents the formation of a negative voltage across output capacitor 34. Accordingly, the discriminator 11 may have a frequency output voltage characteristic of the type represented by the solid line portion P, FIG. 2a.

The development of solid line portion P of the frequency output voltage characteristic shown in FIG. 2a begins when the frequency of the speed-representative signal supplied to input terminals 20–21 becomes equal to the cross-over frequency. With respect to operation of discriminator 11, this means that input signal frequencies in excess of the cross-over frequency will produce conduction through diode 33 during positive half cycles. For input signal frequencies less than the crossover frequency the network comprised of parallel-resonant circuit 24 and associated circuit elements between input terminal 20 and diode 33 effectively constitutes a closed circuit between input terminals 20–21.

A qualitative explanation of the operation of discriminator 11 resulting in the frequency output voltage characteristic of FIG. 2a will be set forth in terms of the well known frequency-impedance characteristics of capacitors and inductors. Included among these is the fact an A.-C. signal of increased frequency across an inductor results in an increasing inductive reactance, or opposition, which reduces the magnitude of current flow, while the same signal coupled across a capacitor results in a diminishing capacitive reactance, or opposition, and an increased magnitude of current flow. The low impedance of series-resonant and the very high impedance of parallel-resonant L-C circuits at their respective resonant frequencies also is important in understanding qualitatively the operation of discriminator 11.

With these elementary concepts in mind, it should be apparent that the input signal will have three principal unidirectional circuit paths between the input terminals 20–21. These are (1) a first circuit path via series connected capacitor 26 and diode 31, (2) a second circuit path via series-connected capacitor 25, inductor 27, and diode 31, and (3) a third circuit path via series-connected capacitor 25, diode 33, and output capacitor 34.

First, assume that the input signal is increasing through a range somewhat lower than the crossover frequency. As represented by the dotted line-portion N of the characteristic curve of FIG. 2a, a negative voltage will be developed on the anode of diode 33, and across output capacitor 34 when resistor 82 is utilized. When resistor 82 is omitted, as would be the case for all embodiments of this invention except the one represented in FIG. 6, no voltage is developed across the output capacitor 34. In the frequency range below crossover, the negative voltage represented by the dotted line portion N will be developed on the anode of diode 33, because the inductor 27 constitutes an impedance somewhat lower than that of the unidirectional circuit path formed by capacitor 25, diode 33 and output capacitor 34. Hence, positive half cycles of the input signal result in conduction through the first unidirectional circuit path, 26–31, and the second circuit path 25–27–31, but not the third 25–33–34. During negative half cycles, all circuit paths between the input terminals 20–21 include resistor 32, having a resistance typically on the order of a megohm. As a result, negative voltage developed across capacitors 30 and 26 effectively is applied via inductor 27 to the anode of diode 33, and no output voltage can be developed across the output capacitor 34 in the absence of resistor 82.

As the input frequency increases still further, a negative peak is formed in the dotted line portion N of the frequency-output voltage characteristic. The formation of the negative peak occurs when the frequency of the input signal becomes high enough to cause the capacitor 25 and inductor 27 effectively to become series resonant, and establish a non-reactive very low impedance path between the respective anodes of diodes 33 and 31. As a result, the positive half cycles are discharged to input terminal 21 via diode 31, and have less and less effect on the negative voltage developed across 26 and 30 until the apparent series resonant frequency $f_r'$ is exceeded. When this occurs the negative voltage begins to diminish.

By tuning the parallel-resonant circuit 24 to have an apparent resonant frequency $f_r''$ higher than the apparent series frequency $f_r'$ the voltage developed on the anode 33 abruptly reverses polarity, rapidly becomes positive when the input signal exceeds the crossover frequency, and forms the positive peak of the solid-line portion P of the frequency-output voltage characteristic, FIG. 2a. As frequency increases still further, the output voltage diminishes from the peak of solid-line portion P, but remains positive in polarity. The development of the solid-line portion P begins when the input signal frequency becomes high enough to produce a sufficient resonant response of the parallel L-C network 24. When this occurs, the impedance of parallel-resonant circuit 24 becomes indefinitely high and far exceeds the impedance of the unidirectional third circuit path via capacitor 25, diode 33 and output capacitor 34. Accordingly, virtually all of the energy of the positive half cycles of the input signals is made available at the anode of diode 33. This results in periodic conduction of the latter and the build up of the positive output voltage P across the output capacitor 34. The negative half cycles effectively are blocked by diode 34 and parallel-resonant circuit 24, and have slight if any effect on the resulting output voltage.

When the input signal frequency increases beyond the parallel-resonant frequency $f_r''$, the impedance of inductor 27 becomes much higher than that of the capacitors in the network. For this reason, the second circuit path 25–27–31 is relatively less important in analyzing circuit operation, and attention may be focused mainly on the second and third circuit paths, 26–31 and 25–33–34, respectively. Under these circumstances positive half cycles entering the third circuit 25–33–34, finding a very high impedance presented by inductor 27, develop a net positive charge on the upper plate of capacitor 25. It should be noticed that in the frequency range below the crossover frequency, positive half cycles of the input signal are presented with a relatively low impedance circuit path via inductor 27 and diode 31 to terminal 21. For this reason, most of their energy is returned to the input terminal 21 via diode 31. Hence, their effect on the potential developed on the anode of diode 33 is small, and always remains less than the negative voltage stored by capacitors 26 and 30. For frequencies higher than crossover the greatly increased impedance of inductor 27 renders this discharge path unavailable to the positive half cycles, and they begin to control the voltage polarity developed on the anode of diode 33.

When diode 33 conducts on positive half-waves of the input A.-C. signal capacitor 34 is charged with a positive potential. When the positive potential developed across capacitor 34 becomes sufficient, it triggers gate electrode 35 of controlled rectifier 37 to initiate the frequency (speed) limiting action.

The afore-described discriminator arrangement has significant attributes. Capacitor 34 requires that a sufficient charge be stored before control occurs. This effectively prevents actuation of the control function by a random pulse, or a few such pulses; i.e., "electrical noise."

There also occurs what may most descriptively be termed an "electrical bounce" in the discriminator circuit when the rapidity with which frequency increases is great; such as under conditions of mechanical "runaway." That is, if the rapidity of frequency increase is, for example, two thousand cycles per second per second the output of the discriminator will be twice that when the rapidity of frequency increase is one thousand cycles per second per second. This example is not intended to indicate a linear increase of output with rapidity of frequency increase, but to illustrate the nature and dimension of the increase of output under such conditions.

This effect is of great value in insuring that the speed control shall be effective. Turbine over-speed tests have been made in which turbine accelerations in excess of ten thousand radians per second per second have been controlled and laboratory simulated tests have given actuation on frequency changes corresponding to nearly a quarter-million radians per second per second.

With the greater amplitude of response from the discriminator circuit per se for rapid frequency changes fewer pulses are required to build the charge on capacitor 34 to the triggering potential for gate electrode 35, thus the more rapidly and certainly the control is exercised.

The only load current flowing in the device of FIG. 2 during normal or stand-by conditions is the leakage current of controlled rectifier 37. Since this is very small, the power requirements during such conditions may be on the order of milliwatts or depending on the voltage between terminals 21 and 41.

During conduction upon the occurrence of an overspeed condition, the maximum forward voltage drop is less than 1.2 volts at a current of one ampere, thus the power dissipation in control is less than 1.2 watts. If the voltage supplied to terminal 41 is 28 volts D.C., the power dissipation is 28 watts, and so the efficiency is about 96%. If the voltage at terminal 41 is 120 volts D.C. the controlled power is 120 watts and so the efficiency will be greater than 99%.

The turn-on power gain of the device of FIG. 2 is relatively high. This is approximately 2,300 when 1 ampere at 28 volts D.C. is being controlled by a relatively insensitive type of silicon controlled rectifier. However, with usual components and with a greater power being controlled the power gain is of the order of 100,000.

In FIG. 3 is shown a high power addition to the control of FIG. 2. The discriminator portion of FIG. 2 and of FIG. 3 are the same, as are the basic aspects of the prime mover control 1. However, the SCR power control 14 of FIG. 2 is eliminated in favor of that of FIG. 3 having the general reference numeral 45. This substitution is accomplished at points labelled 46, 47 and 48 in FIG. 2 by substituting therefor points labelled 46', 47' and 48' in FIG. 3.

In FIG. 3, controlled rectifier 37' is essentially the same as the previously described controlled rectifier 37. For convenience it may be exactly the same, since this type of rectifier in this rating is of transistor size and thus is made as small as possible in order to minimize the bulk of the whole device.

However, as used in FIG. 3, the current capabilities of the controlled rectifier 37' are not utilized to any appreciable extent. A current of only a few milliamperes is employed, rather than of the order of an ampere, as in FIG. 2. Only this small order of power is required of this controlled rectifier 37' because its sole function is to trigger the second controlled rectifier 52.

The operation of controlled rectifier 37' is arranged to be at a low power level by the inclusion of a large value cathode resistor 49 in FIG. 3. This resistor is in the range of ten thousand ohms. It is sufficiently large in resistance value so that once rectifier 37' has been triggered it shuts itself off due to insufficient cathode-anode current flow. This provides a pulse for triggering the succeeding controlled rectifier 52, averts needless power consumption, and facilitates automatic reset with respect to the first controlled rectifier 37'.

A coupling capacitor 50 is connected to the cathode of controlled rectifier 37' and to the gate electrode 51 of controlled power rectifier 52. Capacitor 50 may have a capacitance of a half microfarad. Between gate 51 and terminal 48' (signal ground) is connected gate return resistor 53, which may have a resistance of a thousand ohms. The cathode of controlled rectifier 52 is connected to terminal 48' and the anode of the same to terminal 46'. The anode of controlled rectifier 37' is connected to a D.C. supply terminal 54.

The current-carrying capability of controlled rectifier 52 may be any amount greater than that of 37' in order to take advantage of the two stage arrangement, preferably many times that of the smaller controlled rectifier; for example, up to one hundred amperes. Because of the large power gain from gate electrode to anode-cathode circuit of these devices, such output powers are readily possible. As a result, prime mover controls of large power requirements can be successfully operated directly from the output of the device of FIG. 3.

Where it is desirable to supply an additional component of triggering signal for actuating the SCR power control 14, an over acceleration signal also is developed by the frequency differentiator 64 of FIG. 4 and is added to that developed by the basic circuit of FIG. 2.

In FIG. 4 the frequency discriminator is represented by block 11. A branch lead 56 is taken from A.-C. signal terminal 20 to the anode of a diode 57, which may be of the semiconductor type. This allows the positive portions of the incoming A.-C. signal to pass on to capacitor 58 and shunting resistor 59. The former may have a capacitance on the order of one-tenth microfarad, and the latter a resistance of a thousand ohms. A variable resistor 60 and the cathode of an avalanche or Zener diode 61 are connected to capacitor 58 and resistor 59. The second terminal of variable resistor 60 connects to the negative (signal ground) terminal 21. The anode of Zener diode 61 connects to a capacitor 62, which also connects to terminal 21. Zener diode 61 also connects to conductor 15 via conductor 63, which also connects to capacitor 62. The variable range of resistance of resistor 60 extends from a few ohms to perhaps several thousand ohms. The breakdown voltage of Zener 61 in conjunction with the adjustment of resistor 60, determines at what acceleration signal level the frequency differentiator circuit 64 will add a positive voltage contribution to conductor 15. This is typically a breakdown voltage of a few volts.

Principally capacitor 58 and resistor 60 form the first derivative of the rectified A.C. signal input from terminal 20. Accordingly, when the increase in frequency of this signal is rapid the output at conductor 63 is large. This output is added to that from frequency discriminator 11, which in itself supplies an increased output for rapid increases in frequency, as has been explained. The rapidity and certainty with which a triggering positive pulse is formed upon conductor 15 and conveyed to the gate electrode of SCR power control 14 is thus seen to be enhanced, and the response and reliability of the turbine control novel.

As in earlier figures, the control power output from the SCR power control 14 passes to prime mover control 1, which also receives D.-C. control power from terminal 41.

The prime objective of the embodiments of this invention previously disclosed is to act as an overspeed, or safety, control upon rotating apparatus or any equivalent from which a frequency proportional to the parameter to be controlled can be obtained. Upon an overspeed condition developing, the prior embodiments give a strong electrical power surge acting to close a fuel valve, for example, and to shut down the machine controlled until the system is manually reset.

The embodiments of FIGS. 5 and 6 include automatic reset means, and so act in a more sophisticated manner with respect to safety and also act in a manner to control the speed of the machine at or about the speed selected by an adjustment of the control of this invention.

In FIG. 5, time delay is employed to accomplish reset. The apparatus shown schematically in this figure connects at the three points 46, 47 and 48 in place of the SCR power control 14 of FIG. 2. In FIG. 5 the corresponding connections are 46″, 47″ and 48″. Controlled rectifier 66 has its gate electrode connected to the discriminator 11 for triggering, and its anode to the prime mover control 1, as before. However, the cathode of controlled rectifier 66 is connected to resistor 67, having a resistance of the order of ten ohms, and the opposite end of the resistor is connected to terminal 21 via conductor 48″. This resistor provides an appropriate voltage for delay network 68, 69.

Time delay resistor 68 is preferably adjustable, as from a few ohms to ten-thousand ohms, in order that the time of delay can be adjusted. Time delay capacitor 69 has a capacitance on the order of a tenth microfarad. Resistor 68 is connected to gate electrode 70 of controlled rectifier 71 and capacitor 69 is connected between the gate electrode and conductor 48″. Cathode 72 of controlled rectifier 71 is similarly connected to conductor 48″, and anode 73 of the same is connected through a commutating capacitor 74, of one tenth microfarad capacitance, to the prime mover control 1 via conductor 46″.

In accordance with this circuit arrangement an electrical time delay of a small fraction of a second occurs before an electrical firing pulse generated across resistor 67 appears at gate electrode 70 of controlled rectifier 71. Through commutating capacitor 74 current is drawn by anode 73 of controlled rectifier 71. This is sufficient to drop the anode potential of rectifier 66 low enough to cut off anode current through the latter, thereby causing this rectifier to revert to the forward blocking state of no current flow. Similarly, controlled rectifier 71 will cease to conduct and will revert to its blocking state when capacitor 74 has become charged. There is then no path by which continuous direct current can flow to anode 73.

If the apparatus is employed for overspeed limiting only, the turbine will again overspeed if a fault persists in its system and the process will be repeated until the fault is cleared.

When the apparatus is employed as a speed control the time constant of the delay elements 68 and 69 is selected so that the network, in combination with the acceleration constant of the prime mover and load, and the response characteristic of the fuel feed system, will result in on and off periods of power to the compressor which will minimize speed variations.

In FIG. 6 is shown a modification in which a frequency type of reset operation is provided.

One modification is made in the circuit of the frequency discriminator 11 of FIG. 2 in that a resistor 82 is placed across diode 33. As originally disclosed only an output of positive polarity could be obtained at gate electrode 35 of controlled rectifier 37 because of the unilateral conductivity of the diode 33. As soon as this conductivity is made bilateral by resistor 82, negative outputs are also possible.

In FIG. 6, the points 46‴, 47‴ and 48‴ are connected to points 46, 47 and 48 in FIG. 2 in substitution for the SCR power control 14 of that figure. In FIG. 6, controlled rectifier 37 is employed and connected as it was in FIG. 2. This rectifier is the usual type, having the equivalent of a PNPN semiconductor arrangement of material and requiring a positive pulse to actuate the gate electrode 35.

Although less well known, controlled rectifiers of the NPNP semiconductor arrangement of material are possible and these require a negative pulse to actuate the gate electrode. Accordingly, controlled rectifier 76 is employed, with the gate electrode 77 connected to point 47‴ in common with the gate electrode 35 of controlled rectifier 37, the cathodes 36 and 78 of each are connected in common to conductor 48‴, and the anodes 38 and 79 are connected to the prime mover control 1 via point 46‴, with anode 79 being thus connected through a capacitor 80, having a capacitance of the order of one tenth microfarad.

In the circuit of FIG. 6, controlled rectifier 37 conducts when a positive output from the discriminator 11 appears at point 47‴. As explained above, this occurs when the pre-set speed of the turbine (or equivalent machine) is reached. The prime mover control 1 disconnects the power from the prime mover 5, and the speed of the latter decreases. As soon as speed decreases below the pre-set value a negative output voltage appears at point 47‴ because of the resistor 82 added across diode 33. This output, at gate electrode 77 of controlled rectifier 76 causes this rectifier to conduct. In the same way as in FIG. 5, anode current through capacitor 80 in FIG. 6 causes conduction to cease through controlled rectifier 37. Conduction also subsequently ceases through rectifier 76 as soon as capacitor 80 is charged.

When controlled rectifier 37 ceases to conduct, power from the prime mover 5 is again applied to the compressor 7 and the speed increases. When the preset speed is again reached a positive output is obtained from the discriminator 11 and the whole process is repeated. It will be seen, therefore, that the speed will fluctuate at a value near the preset value, and that speed control will be accomplished. It will be understood that with most speed controls an error in speed must occur in order that an error signal be generated for control, and so it is in the present case. As was also the case with FIG. 5, proportioning of the electrical response in relation to mechanical and control inertias allows relatively close regulation of speed.

In the embodiment of FIG. 6, speed is the only parameter sensed. Thus the speed control will be exercised with accuracy regardless of the load upon the turbine or other factors of a like nature.

The gate electrodes 35 and 77 are selective as to the polarity of potentials impressed thereon. That is, a positive potential on gate electrode 35 triggers controlled rectifier 37, but a negative potential has no effect whatever upon it; and vice versa for gate electrode 77 of rectifier 76.

It will be understood that the electrical frequency at which regulation takes place may be selected over a very wide range of frequencies by suitably arranging the resonant frequency of the split-capacitor resonant circuit 24, and by choosing associated components to have proper impedances in the range of frequencies over which control is sought, according to the teaching of this specification. The invention has been embodied for control frequencies selectable within the range of one hundred cycles to ten thousand cycles. This range will be found suitable for substantially all embodiments desired, since the frequency generated by speed detector 9 of FIG. 1 can be chosen to lie within this range for the rotational speed involved in any instance. However, the range given is illustrative, and is not a limitation upon the application of the invention.

In the application of this invention the output of speed detector 9 should be relatively free of harmonics, as should any other device or alternator source employed for the same purpose. This is to prevent a large harmonic from having sufficient amplitude to actuate the discriminator 11 while the turbine (or equivalent) prime mover 5 is gaining speed from a prior condition of rest. For example, if element 9 would have a strong third harmonic and the control frequency of the discriminator was 1500 cycles, when the speed detector 9 was generating a fundamental frequency of 500 cycles the third harmonic thereof might actuate the discriminator 11 if the third harmonic was of sufficient amplitude relative to the fundamental. Should this occur, the prime mover 5 would be regulated at a speed corresponding to one-third that actually desired.

It will be understood that this condition may easily be avoided by known principles of design of element 9 or its equivalent.

Also, by including an M-derived filter in the output circuit of speed detector 9 having a characteristic to reasonably attenuate the lower frequencies generated by this element, the conflict may also be avoided. In the example given, the second harmonic of 750 cycles would be the last harmonic to have the value of 1500 cycles. Accordingly, the M-derived filter is designed to attenuate frequencies at and below 750 cycles. This prevents alternating energy capable of causing spurious operation from reaching the discriminator 11, and so insures against these rather unusual but possible aspects of operation.

Although specific examples of voltages, currents and values for the several circuit elements have been given in this specification to illustrate the invention, it will be understood that these were by way of example only and that reasonably wide departures can be taken therefrom without departing from the inventive concept.

Modification of the circuit elements, details of circuit connections, alteration of the coactive relation between elements and application of the invention to various control purposes may also be taken under the invention as disclosed.

Having thus fully described my invention and the manner in which it is to be practiced, I claim:

1. An electrical speed control circuit including semiconductor elements comprising: a parallel resonant circuit having a split-capacitor and a variable inductor; means for generating alternating electrical energy having a frequency of alternation related to the speed to be controlled; a temperature-sensitive resistor connected across said generating means, said temperature-sensitive resistor also connected across part of the capacitor comprising said split-capacitor to introduce said electrical energy to said resonant circuit; a pair of semiconductor diodes to pass the positive polarity of alternate half-waves of said alternating electrical energy, the anode of each of said diodes connected to an opposite end of said inductor; a filter resistor connected across one of said diodes; a filter capacitor connected between the cathodes of each of said diodes; a semiconductor controlled rectifier having a cathode, an anode and a gate electrode, the cathode of said controlled rectifier connected to the cathode of one of said diodes, the gate electrode of said controlled rectifier connected to the cathode of the other said diode to cause said controlled rectifier to conduct when the amplitude of the positive charge upon said filter reaches a predetermined value; inductive electrical speed control means, the anode of said controlled rectifier connected to said electrical speed control means for the on-off control thereof; and a capacitor and a resistor connected in series between the cathode and the anode of said controlled rectifier to sustain current flow in said controlled rectifier, said temperature-sensitive resistor decreasing in resistance with increasing temperature to compensate for the electrical performance of said semiconductor controlled rectifier as a function of temperature.

2. An electrical control circuit comprising: a single parallel resonant circuit having a split-capacitor and an inductor; means for generating an alternating current having a frequency related to the control desired, said generating means connected to said split-capacitor; a pair of diodes connected to opposite ends of said inductor to pass one polarity of said alternating current; a capacitor connected across said diodes to receive a charge of one polarity; a first controlled rectifier having a cathode and a gate, said gate connected to said capacitor to cause said first rectifier to conduct when said capacitor receives a charge of one polarity; an impedance connected to the cathode of said first rectifier to terminate conduction of said first rectifier; a second rectifier having a cathode, an anode and a gate; means for coupling the cathode of said first rectifier to the gate of said second rectifier so as to cause said second rectifier to conduct when said first rectifier conducts said second rectifier connected to said generating means for adjusting said generating means to a preselected control frequency so as to produce a desired control effect.

3. An electrical overspeed control circuit including semiconductor elements comprising: a parallel resonant circuit having a split-capacitor and an inductor; means for generating an alternating voltage having a frequency proportional to the speed to be controlled, said means connected across one-half of said split-capacitor; one semiconductor diode connected to each end of said inductor to pass one polarity of said alternating voltage; a capacitor connected across said diodes to accumulate a charge of one polarity when the resonant frequency of said parallel resonant circuit is exceeded by said generating means; a first controlled rectifier having a cathode, an anode and a gate, said gate connected to said capacitor to cause said first controlled rectifier to conduct when said capacitor accumulates a charge; a resistor in the cathode circuit of said first controlled rectifier for rendering said first controlled rectifier nonconducting; a second controlled rectifier having a cathode, an anode and a gate; resistor-capacitor means for coupling the cathode of said first controlled rectifier to the gate of said second controlled rectifier to cause said second controlled rectifier to inaugurate conduction when said first controlled rectifier becomes conducting, said second controlled rectifier having larger current conducting capability than said first controlled rectifier so as to directly actuate control means for preventing overspeed at a selected alternating frequency.

4. An electrical speed control circuit comprising: a single parallel resonant circuit; means for generating alternating electrical energy having a frequency related to the speed of means to be controlled; rectifying means connected to said resonant circuit; means for accumulating a charge connected to said rectifying means; a controlled rectifier having a gate electrode, said gate electrode connected to said charge accumulating means to cause said controlled rectifier to conduct upon the accumulation of a predetermined charge; said controlled rectifier connected to said means to be controlled; a diode, said diode and said resonant circuit both connected to said generating means; an electrical differentiating circuit connected to said diode; electrical threshold means connected to said differentiating circuit and to a charge-accumulating capacitor, said charge-accumulating capacitor also connected to said gate electrode; said differentiating circuit constituted to form an output of electrical energy proportional to the rate of change of frequency produced by said generating means; and means to add to the charge conveyed to said gate electrode when said electrical energy output exceeds the threshold of said electrical threshold so as to cause said controlled rectifier to conduct and supply an output to said means to be controlled for the control thereof.

5. An electrical overspeed control circuit including semiconductor elements comprising: one parallel resonant circuit; means for generating alternating electrical energy having a frequency related to the speed of means to be limited, said generating means connected to said resonant circuit; semiconductor rectifying means connected to said resonant circuit; means for accumulating a charge connected to said rectifying means so as to receive a charge when the frequency of said generating means exceeds the resonant frequency of said resonant circuit; a controlled rectifier having a gate electrode, said gate electrode connected to said charge accumulating means to cause said controlled rectifier to conduct upon the accumulation of a predetermined charge, said controlled rectifier connected to said means to be limited; a diode connected to said generating means; a resistor-capacitor differentiating circuit connected to said diode; a Zener diode connected to said differentiating circuit and to a charge-accumulating capacitor, said charge-accumulating capacitor also connected to said gate electrode, said differentiating circuit constituted to form an output of electrical energy proportional to the rate of change of frequency produced by said generating means and upon said electrical output exceeding the breakdown potential of said Zener diode to add to the charge conveyed to said gate electrode for causing said controlled rectifier to conduct and thereby to supply an electrical output to correct overspeed of said means to be limited.

6. A parameter control circuit comprising: a single parallel resonant circuit; means for generating alternating electrical energy having a frequency proportional to a given parameter of means to be controlled, said generating means connected to said resonant circuit; rectifying means connected to said resonant circuit; first means for accumulating a charge connected to said rectifying means; a first controlled rectifier having first cathode, anode and gate electrodes, said first gate connected to said first charge accumulating means so as to cause said first controlled rectifier to conduct electricity upon the accumulation of a predetermined charge on said first charge accumulating means; an impedance in the circuit of said first cathode; electrical delay means connected to said impedance; a second controlled rectifier having second cathode, anode and gate electrodes, said second gate connected to said delay means to cause said second controlled rectifier to conduct after a time interval determined by said delay means; second means for accumulating a charge connected between said first and said second anodes to halt conduction of said first controlled rectifier upon conduction being established in said second controlled rectifier; and means for controlling the given parameter of said means to be controlled, said first anode connected to said controlling means so as to affect control of said parameter.

7. An electrical speed control circuit including semiconductor elements comprising: one parallel resonant circuit; means for generating alternating electrical energy having a frequency related to the speed of means to be controlled, said generating means connected to said resonant circuit; semiconductor rectifying means connected to said resonant circuit; a first capacitor connected to said rectifying means to receive a charge when the frequency of said generating means exceeds the resonant frequency of said resonant circuit; a first controlled rectifier having first cathode, anode and gate electrodes, said first gate connected to said first capacitor to cause said first controlled rectifier to conduct electricity between the cathode and the anode thereof upon the accumulation of a predetermined charge on said first capacitor; a resistive impedance in the circuit of said first cathode; a resistive-capacitative delay circuit connected to said impedance; a second controlled rectifier having second cathode, anode and gate electrodes, said second gate connected to said delay circuit to cause said second controlled rectifier to conduct after a delay determined by said delay circuit; a second capacitor connected between said first and said second anodes to halt conduction between the cathode and anode of said first controlled rectifier upon conduction being established between the cathode and anode of said second controlled rectifier; means for controlling the speed of said means to be controlled, said first anode connected to said controlling means for affecting the same in an on-off sequence for the control of said speed.

8. A parameter control circuit comprising: a single parallel resonant circuit; means for generating alternating electrical energy having a frequency related to a selected parameter of means to be controlled, said generating means connected to said resonant circuit; plural means for partially rectifying electrical energy from said resonant circuit; a first capacitor connected to said rectifying means; a first controlled rectifier having a first gate electrode constituted to cause said first controlled rectifier to conduct when a given positive potential is impressed upon said gate, said gate connected to said first capacitor to receive the said potential; a second controlled rectifier having a second gate electrode constituted to cause said second controlled rectifier to conduct when a given negative potential is impressed upon said second gate, said first and second controlled rectifiers having first and second anodes, respectively; a second capacitor connected between said first and second anodes to halt conduction through said first controlled rectifier upon the initiation of conduction through said second controlled rectifier, said resonant circuit, plural means for partially rectifying and said first capacitor constituted to supply a positive charge upon said first capacitor at frequencies in excess of a predetermined frequency established to control said selected parameter of said means to be controlled, and to supply a negative charge upon said first capacitor at frequencies less than said predetermined frequency; means for controlling said parameter of said means to be controlled, said first controlled rectifier connected thereto to adjust said parameter in one direction upon conducting and to adjust said parameter in the opposite direction when not conducting.

9. An electrical speed control circuit including semiconductor elements comprising: a parallel resonant circuit; means for generating alternating electrical energy having a frequency proportional to the speed of means to be controlled, said generating means connected to said resonant circuit for the excitation thereof; plural semiconductor means connected to opposite terminals of said resonant circuit for partially rectifying electrical energy from said resonant circuit; a first capacitor connected to said plural rectifying means; a first controlled rectifier having a first gate electrode constituted to cause said first controlled rectifier to conduct electricity when a given position potential is impressed upon said gate, said gate connected to said first capacitor to receive said potential; a second controlled rectifier having a recond gate electrode constituted to cause said second controlled rectifier to conduct electricity when a given negative potential is impressed upon said second gate from said first capacitor, said first and second controlled rectifiers having first and second anodes, respectively; a second capacitor connected between said first and second anodes to halt conduction through said first controlled rectifier upon the initiation of conduction through said second controlled rectifier, said resonant circuit, plural semiconductor rectifying means and said first capacitor comprising a frequency discriminator to supply a positive charge upon said first capacitor at frequencies in excess of the resonant frequency of said resonant circuit and to supply a negative charge upon said first capacitor at frequencies less than said resonant frequency; and means for controlling the speed of said means to be controlled, said first controlled rectifier connected thereto to decrease said speed upon conducting and to allow an increase of speed when not conducting.

10. In a frequency-control system including means for generating an alternating electrical signal of variable frequency,
 means coupled to the generating means and responsive to a control voltage for controlling the frequency of the alternating signal,
 and means coupled effectively to the generating means and the controlling means, and responsive to the alternating signal for developing a first unidirectional output voltage whenever the frequency of the alternating signal deviates from a predetermined frequency,
 apparatus for enhancing the magnitude of the unidirectional output voltage in accordance with the rate of change of frequency of the alternating signal, the enhancing apparatus comprising:
  a unidirectionally-conductive device coupled to the generating means;
  a differentiating network coupled to the unidirectionally-conductive device for developing a second unidirectional voltage representing the rate of change of frequency of the alternating signal;

means coupled to the differentiating network and the developing means for adding the first and second unidirectional voltages to produce a unidirectional output voltage of enhanced magnitude.

11. In a frequency-control system including means for generating an alternating electrical signal of variable frequency, means coupled to the generating means and responsive to a control voltage for controlling the frequency of the alternating signal, and means coupled effectively to the generating means and the controlling means, and responsive to the alternating signal for developing a first unidirectional output voltage whenever the frequency of the alternating signal deviates from a predetermined frequency, apparatus for enhancing the magnitude of the unidirectional output voltage in accordance with the rate of change of frequency of the alternating signal, the enhancing apparatus comprising:
 a unidirectionally-conductive device coupled to the generating means;
 a differentiating network coupled to the unidirectionally-conductive device for developing a second unidirectional voltage representing the rate of change of frequency of the alternating signal;
 means coupled to the differentiating network and responsive to a predetermined magnitude of the second unidirectional voltage for establishing an output circuit;
 and means coupled to the output-circuit establishing means and the developing means for adding the first and second unidirectional voltages to produce a unidirectional output voltage of enhanced magnitude;
 and means coupled to the adding means and the controlling means, and responsive to the unidirectional output voltage of enhanced magnitude, for producing a control voltage for activating the controlling means.

12. In a frequency-control system as represented in claim 11, apparatus for minimizing frequency deviations wherein the output-circuit establishing means comprises a semiconductor device.

13. In a frequency-control system including means for generating an alternating electrical signal of variable frequency, and means coupled to the generating means and responsive to a control voltage for controlling the frequency of the alternating signal, apparatus coupled to the generating means and to the controlling means, and responsive to the alternating signal for minimizing deviations in one direction from a predetermined frequency, the apparatus comprising:
 first means coupled to the generating means and including a tuned inductance-capacitance network for developing a unidirectional output voltage in response to the alternating signal only when the frequency of the latter deviates in a preselected direction from the predetermined frequency;
 second means coupled to the first means and to the controlling means for developing a control voltage for the controlling means, the second means including a semiconductor switch having a control electrode coupled to the first means and a controlled circuit coupled to the controlling means, the controlled circuit including further means for developing a timing signal whenever the first semiconductor switch is closed;
 and third means coupled to the further means and responsive to the timing signal for opening the semiconductor switch at the end of a time interval of predetermined duration.

14. In a frequency-control system as represented in claim 13, apparatus for minimizing frequency deviations wherein the third means comprises:
 an integrating network coupled to the further means,
 and a normally-closed second semiconductor switch having a control electrode coupled to the integrating network, and a controlled circuit including a capacitor coupled in parallel relation to the controlled circuit of the semiconductor switch of the second means.

15. In a frequency-control system including:
means for generating an alternating electrical signal of variable frequency, and means coupled to the generating means and responsive to a control voltage for controlling the frequency of the alternating signal;

apparatus coupled to the generating means and to the controlling means, and responsive to the alternating signal for minimizing deviations from a predetermined frequency, the apparatus comprising:
 first means coupled to the generating means, and including two diodes and a tuned inductance-capacitance circuit incorporated in a network characterized by series-resonant properties resulting in development of an output voltage of first polarity across one of the diodes when the alternating-signal frequency is less than the predetermined frequency, by parallel-resonant properties resulting in an output voltage of second polarity across the one diode when the frequency of the alternating signal exceeds the predetermined frequency, and effectively zero output voltage across the one diode when the alternating-signal frequency is equal to the predetermined frequency;
 and second means coupled to the first means and to the controlling means, and responsive at least to a unidirectional output voltage of one polarity for developing a control voltage to actuate the controlling means as required to minimize the frequency deviations,
 the second means including a first normally-open semiconductor switch having a control electrode coupled to the first means, and further means including a controlled circuit coupled to the controlling means for providing a control voltage to the latter to control frequency in one direction upon closing of the first switch in response to a unidirectional output voltage of one polarity from the first means,
 the second means further including a second normally-open semiconductor switch having a control electrode coupled to the first means, and a controlled circuit including a capacitor coupled in parallel with the controlled circuit of the first switch to reopen the latter in response to a unidirectional output voltage of another polarity, so that the controlling means will be deactuated, and the frequency of the alternating signal may change in the other direction.

16. In a frequency-control system including means for generating an alternating electrical signal of variable frequency, and means coupled to the generating means and to the controlling means, and responsive to a control voltage for controlling the frequency of the alternating signal, apparatus coupled to the generating means and to the controlling means, and responsive to the alternating signal for minimizing deviations of the latter from a predetermined frequency, the apparatus comprising:

first means coupled to the generating means, and including two diodes and a tuned inductance-capacitance circuit incorporated in a network characterized by series-resonant properties resulting in development of an output voltage of one polarity across one of the diodes when the alternating-signal frequency is less than a predetermined value, by parallel-resonant properties resulting in an output voltage of the other polarity across the one diode when the frequency of the alternating signal exceeds the predetermined value, and effectively zero output voltage across the one diode when the alternating-signal frequency is equal to the predetermined value;

an output circuit including a capacitor connected in series with the one diode for extracting an output voltage of one polarity from the first means;

and second means, including a controlled diode having a control electrode coupled to the output circuit, and further means including a controlled circuit through the diode coupled to the controlling means for producing a control voltage for actuating the latter in order to minimize the frequency deviation represented by the one-polarity output voltage.

17. In a frequency-control system as represented in claim 16, apparatus for minimizing frequency deviations of the alternating signals wherein the second means comprises:

means including a first switching device having a controlled circuit coupled to the controlling means for providing a control voltage for actuating the latter, and a control electrode responsive to the output voltage for initiating conduction through the controlled circuit;

means coupled to the controlled circuit for providing a timing signal whenever conduction occurs through the latter;

and means coupled to the providing means and to the first switching device, and responsive to the timing signal for terminating conduction in the first switching device at the end of a time interval of predetermined duration.

18. In a frequency-control system including
means for generating an alternating electrical signal of variable frequency;
and means coupled to the generating means and to the controlling means, and responsive to a control voltage for controlling the frequency of the alternating signal,
apparatus coupled to the generating means and to the controlling means, and responsive to the alternating signal for minimizing deviations of the latter from a predetermined frequency, the apparatus comprising:

first means coupled to the generating means, and including two diodes and a tuned inductance-capacitance circuit incorporated in a network characterized by series-resonant properties resulting in development of an output voltage of first polarity across one of the diodes when the alternating-signal frequency is less than the predetermined frequency, by parallel-resonant properties resulting in an output voltage of second polarity across the one diode when the frequency of the alternating signal exceeds the predetermined frequency, and effectively zero output voltage across the one diode when the alternating-signal frequency is equal to the predetermined frequency;

an output circuit including a resistor coupled in parallel across the one diode, and a capacitor coupled in series relation with the one diode and resistor for extracting from the first means output voltages of first and second polarities;

means for providing a control voltage to the controlling means, the providing means including a first switching device having a controlled circuit coupled to the controlling means, and a control electrode coupled to the output circuit and responsive to one only of the first and second output voltages for initiating conduction through the controlled circuit;

and means coupled to the output circuit and to the first switching device for terminating conduction in the latter in response to the other of the first and second output voltages.

19. In a frequency-control system as represented in claim 18, apparatus for minimizing frequency deviations of the alternating signal wherein the terminating means comprises a second switching device responsive selectively to an output voltage of the other of the first and second polarities, and having a control electrode coupled to the output circuit, and a controlled circuit including a capacitor coupled in parallel with the controlled circuit of the first switching device.

References Cited by the Examiner

UNITED STATES PATENTS

| 2,395,517 | 2/1946 | Stoller | 318—318 |
|---|---|---|---|
| 2,610,315 | 9/1952 | McKendry et al. | 322—32 X |
| 2,632,856 | 3/1953 | Dupy | 290—40.2 |
| 2,699,499 | 1/1955 | Jordan | 328—138 |
| 2,825,807 | 3/1958 | Moors | 328—140 X |

MILTON O. HIRSHFIELD, *Primary Examiner.*